United States Patent
Kawakami et al.

(10) Patent No.: US 6,505,827 B2
(45) Date of Patent: Jan. 14, 2003

(54) URGING DEVICE PROVIDED WITH MULTIPLE LOADING MEMBER AND PAPER FEEDING DEVICE INCORPORATING THE SAME

(75) Inventors: Kazuhisa Kawakami, Nagano (JP); Kiyoto Komuro, Nagano (JP); Toshikazu Kotaka, Nagano (JP); Takashi Akahane, Nagano (JP); Yasumichi Okuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 09/794,385

(22) Filed: Feb. 28, 2001

(65) Prior Publication Data

US 2001/0026044 A1 Oct. 4, 2001

(30) Foreign Application Priority Data

Feb. 28, 2000 (JP) ......................................... 2000-050629
Jan. 11, 2001 (JP) ......................................... 2001-003199

(51) Int. Cl.$^7$ .............................. B65H 3/56; B65H 1/00
(52) U.S. Cl. ....................................... 271/169; 271/171
(58) Field of Search .................................. 271/169, 171

(56) References Cited

U.S. PATENT DOCUMENTS 4,060,234 A * 11/1977 Motoyama ................... 271/164
4,368,882 A * 1/1983 Ronbeck ....................... 271/135

FOREIGN PATENT DOCUMENTS

JP            6-179532    *  6/1994 ........... B65H/1/26

* cited by examiner

*Primary Examiner*—Donald P. Walsh
*Assistant Examiner*—Kenneth W Bower
(74) *Attorney, Agent, or Firm*—Sughrue Mion, PLLC

(57) ABSTRACT

Springs 34 and 35 are located on the back face of a paper cassette, between a movable plate 32 and a bar 31, coupled with a side edge aligner 27. A slot extending in the direction in which a spring load is generated is formed in the movable plate, and a hook portion is formed at the end of the spring in the direction in which the spring is extended or contracted. The length of the slot and the length of the spring end in the direction in which the spring load is generated differ for the individual springs, and correspond to the distance the movable plate is displaced. That is, a size difference is defined for each spring until the spring load is applied. During the insertion of the paper cassette, the movable plate is displaced by the mechanism constituted by the groove cam 41 and the boss 36a, and in accordance with the displacement, different spring loads are multiply applied the paper side edge aligning member via the bar.

19 Claims, 14 Drawing Sheets

URGING DEVICE PROVIDED WITH MULTIPLE LOADING MEMBER AND PAPER FEEDING DEVICE INCORPORATING THE SAME

BACKGROUND OF THE INVENTION

The present invention relates to an urging device, including a multiple loading member that employ springs for urging, at multiples, a member displaced by an external force, and relates to a paper feeding device, including the urging device, that is used for a recording apparatus, such as a printer.

In general, mechanisms employing springs are frequently used to provide mechanical control for devices, for example, for urging mechanical components in a specific direction. Spring urging members having such a function are frequently used for recording apparatuses, such as facsimile machines, copiers and printers. As an example, for a paper feeding device used in a recording apparatus, a paper cassette in which a plurality of sheets are stacked is generally used, and spring urging member is employed for an edge guide mechanism that aligns the side edge of the paper stacked in the cassette.

For the printing of data by a recording apparatus equipped with a paper cassette, sheets are fed individually; successive topmost sheets stacked in the paper cassette are intermittently stripped off by feeding rollers and supplied to immediately adjacent conveying rollers, which carry the sheets to the recording head. To perform high quality printing, since the rotation of the paper feeding rollers and the conveying rollers must be controlled precisely, a DC motor and a stepping motor are employed, and a trailing paper edge pushing member is provided for the paper cassette. The trailing paper edge pushing member pushes against the trailing edge of a sheet, or an edge guide member, to align a side edge and ensure that the top sheet is separated and surely fed.

A demand exists for a structure having a different spring urging mechanism that is designed for use with a wide variety of products; a practical, general purpose device that can be manufactured at a low cost. For the mechanism of a paper supply device for pushing against and aligning the side edges of paper, a sufficient pressing force is required to accurately align and maintain the alignment of the paper edges. But too much force should not be applied in this instance, because force exceeding that required for alignment is converted into a load and is applied to the paper feeding and conveying rollers during the paper supply process. If, however, too little pressing force is applied, paper edges are aligned less accurately and the edge guide effect is reduced, and the paper tends to be fed obliquely. It should be further noted that it is not preferable for pressing force to be exerted against the side edges of paper during the paper feeding process; this force is converted into a load and is imposed on the drive motor.

Structures wherein users are required to position paper side edges manually are commonly used. However, since such an operation is tedious and, depending on the user, the positioning of the paper will differ slightly each time it is performed, this requirement tends to aggravate the above problem.

SUMMARY OF THE INVENTION

It is one objective of the present invention to provide an urging device, incorporating a multiple loading member, that facilitates the design of an urging mechanism for utilizing the loading member, and that is suitable for widespread employment for general purpose applications.

It is another objective of the present invention to provide a paper feeding device that employs the urging device as a mechanism for the alignment and the maintenance of the alignment of the side edges of sheets stacked in a paper cassette.

It is an additional objective of the present invention to provide a reliable paper feeding device that reduces the number of paper cassette related operations required of users, thereby removing differences attributable to user performance of paper cassette related operations, and that improves the performance of the paper cassette paper setting function.

In order to achieve the above objects, according to the present invention, there is provided an urging device, comprising:
- a deforming member, being deformable in accordance with an external force;
- a multiple load applier, provided with a plurality of loading members each having an urging ability, for applying an urging force which is generated as a resultant urging force derived from at least one loading member selected from the plural loading members,
- wherein the number of selected loading member is multiply changed in accordance with the deformation amount of the deforming member.

In this configuration, a desired urging force can be exerted against the target by an arbitrary combination composed of plural loading members.

Preferably, the plural loading members include at least two loading members whose urging abilities are different from each other.

In this configuration, even when the deformation amount of the deforming member is unchanged, a change in the resultant urging force can be effected.

Preferably, a predetermined deformation amount of the deforming member is associated with each of the loading member. Each of the loading members has no urging ability when the deformation amount of the deforming member is less than the associated predetermined deforming amount.

In this configuration, an arbitrary urging force can be easily generated by the selection of available loading member.

Preferably, the deformation of the deforming member is established by a cam and a cam follower.

In this configuration, the sequence for providing the load is assigned for a function of the cam, so that a transient urging force change can be applied to the target.

According to the invention, there is also provided a paper feeding device, comprising:
- a cassette member, in which sheets to be fed are stacked;
- a side edge aligner, provided in the cassette member so as to be adjacent to side edges of the stacked sheets;
- a plurality of loading members, being deformable so as to respectively provide an urging force to the side edge aligner, such that the side edge aligner aligns the side edges of the stacked sheets at a predetermined position; and
- a load controller, for deforming the loading members such that a resultant urging force applied to the side edge aligner is multiply varied.

In this configuration, since the necessary pressing force can be exerted only when the side edges of the sheets are aligned, to feed a sheet from the paper cassette, while reducing the drive load imposed on the paper feed rollers, the pressure is reduced so as to maintain only the state wherein the side edges of the sheets are aligned.

Here, it is preferable that the loading members provide the resultant urging force such that the side edge aligner is separable from the side edges of the stacked sheets.

In this configuration, since the resultant urging force exerted by the loading members is concentrated on the side edges of the sheets, the side edges can be efficiently aligned by the application of a minimum load.

Here, it is preferable that the side edge aligner includes a pair of arm members which are almost linearly arranged. Further ends of the arm members are pivotably supported by the cassette member, and closer ends thereof are coupled with the loading members.

In this configuration, since the resultant urging force is concentrated substantially in the middle in the side edges of the paper, the side edges of the paper can be efficiently aligned by the application of a minimum urging force.

Here, it is preferable that the feeding device further comprises.

an urging member for urging the movable plate toward a first direction which is opposed to the aligning movement of the side edge aligner; and a stopper for preventing the movable plate from moving toward the first direction.

Here, the movable plate holds the side edge aligner at a position which is separated from the side edges of the stacked sheets, when the movement of the movable plate is restricted by the stopper.

In this configuration, when the cassette member is removed, i.e., when the cassette member is not attached, no load is imposed on the side edge aligner, and therefore, the side edge aligner does not interfere with the stacking of sheets, and the supplementation of the supply of sheets can be performed efficiently.

Preferably, the load controller includes a movable plate whose displacement amount is associated with the resultant urging force of the loading members. A predetermined displacement amount of the movable plate is associated with each of the loading member. Each of the loading members has no urging ability when the displacement amount of the movable plate is less than the associated predetermined displacement amount.

In this configuration, in accordance with the sheet size stacked in the cassette member, an arbitrary urging force can be easily generated by the selection of the loading member.

Here, it is preferable that each of the loading member is provided with an engagement member. Each of the respective engagement members is placed within a slot which is formed in the movable plate, and which extends in a movable direction of the movable plate. Each of the respective engagement member engages with the associated slot when the displacement amount of the movable plate exceeds the associated predetermined displacement amount.

In this configuration, since normally the slots and the ends of the individual loading members have different shapes, an arbitrary urging force can be easily generated by the selection of slots, and of loading members that have end shapes corresponding to the slots.

Preferably, the paper feeding device further comprises:
a cassette holder, to which the cassette member is detachably inserted; and
a cooperation mechanism for associating an insertion movement of the cassette member with the movement of the movable plate.

In this configuration, after a cassette member has been inserted, the side edges of the sheets are aligned, so that handling of sheets relative to the cassette member can be improved.

Here, it is preferable that the cooperation mechanism includes a boss provided between the movable plate and the cassette member, and a cam groove in which the boss is moved in accordance with the insertion movement.

In this configuration, the side edges of the sheets can be accurately aligned, and oblique feeding due to the non-alignment of sheets, can be prevented.

Preferably, the paper feeding device further comprising a cassette holder, to which the cassette member is detachably inserted. The loading members include at least two loading members whose urging abilities are different from each other. The load controller deforms weaker loading member in an initial stage and a final stage of the insertion operation of the cassette member. The load controller deforms both of weaker and stronger loading members when the side edge aligner aligns the side edges of the stacked sheets.

In this configuration, since a large pressing force is required for the side edge alignment while only a small pressing force is required to maintain the aligned state of the side edges of the sheets, these suited pressing forces can be easily generated.

According to the invention, there is also provided a paper feeding device, comprising:

a cassette member, in which sheets to be fed are stacked;

a side edge aligner, provided in the cassette member so as to be adjacent to side edges of the stacked sheets, the side edge aligner including a first load acting member and a second load acting member;

a movable member, being movable with respect to the side edge aligner, the movable member including a first load application member and a second load application member;

a first elastic member, deformably connected between the first load application member and the first load acting member; and a second elastic member, deformably connected between the second load application member and the second load acting member.

Here, no load is applied on the first and second load application members, when a distance between the movable member and the side edge aligner is a first distance. A first load is applied on the first load application member, and a first urging force for urging the side edge aligner toward the side edges of the stacked sheets acts on the first load acting member, when the distance between the movable member and the side edge aligner increases from the first distance by L1. A second load is applied on the second load application member, and a second urging force acts on the second load acting member in addition to the first urging force, when the movable member is moved so that the distance between the movable member and the side edge aligner increases from the first distance by L2 (L2>L1).

In this configuration, the degree of alignment, produced by the increased pressure applied to the side edges of the sheets, is gradually increased.

Preferably, the first and second load acting members are provided as first and second slots extending in a movable direction of the movable member, respectively. The first elastic member is a tension spring, one end of which is formed with a hook member hooked over the first slot with a clearance L1, and the other end of which is fixed to the first load acting member. The second elastic member is a tension spring, one end of which is formed with a hook member hooked over the second slot with a clearance L2, and the other end of which is fixed to the second load acting member.

In this configuration, when the movable member is shifted, the clearance L1 at the end of the first tension spring is removed and the end engages with the first slot, so that the first tension spring is extended. Since the clearance L2 is larger than the clearance L1, as the shifting of the movable member continues, the second tension spring is subsequently extended. Therefore, the urging force that impels the side edge aligner and presses it against the side edges of the sheets is respectively and gradually increased in accordance with the distance traveled by the movable member.

Alternatively, the first and second load acting members are provided as first and second slots extending in a movable direction of the movable member, respectively. The first elastic member is a tension spring, one end of which is formed with a hook member hooked over the first slot with a clearance L1, and the other end of which is fixed to the first load application member. The second elastic member is a tension spring, one end of which is formed with a hook member hooked over the second slot with a clearance L2, and the other end of which is fixed to the second load application member.

Alternatively, the first and second load application members are provided as first and second slots extending in a movable direction of the movable member, respectively. The first and second load acting members are provided as third and fourth slots extending in a movable direction of the movable member, respectively. The first elastic member is a tension spring, one end of which is formed with a hook member hooked over the first slot, and the other end of which is formed with a hook member hooked over the third slot. The second elastic member is a tension spring, one end of which is formed with a hook member hooked over the second slot, and the other end of which is formed with a hook member hooked over the fourth slot. An additional clearance between the both hook members and the associated slots in the first elastic member is L1. An additional clearance between the both hook members and the associated slots in the second elastic member is L2.

Preferably, the paper feeding device further comprises a cassette holder, to which the cassette member is detachably inserted. The movable member is moved such that only the first urging force is applied to the side edge aligner, then the second urging force is added to the first urging force, and then only the first urging force is applied again, in accordance with the inserting operation of the cassette member.

In this configuration, an increasing load is gradually imposed when the side edges of the sheets are aligned. Then, the load imposed by the elastic members is gradually reduced. Thus, the pressure applied to the side edges of the sheets is reduced while the aligned state of the sheets is maintained and the resistance is reduced when a sheet is fed from the cassette member.

According to the invention, there is also provided a paper feeding device, comprising:
a cassette member, in which sheets to be fed are stacked;
a side edge aligner, provided in the cassette member so as to be adjacent to side edges of the stacked sheets, the side edge aligner including first to n-th load acting members;
a movable member, being movable with respect to the side edge aligner, the movable member including first to n-th load application members; and
first to n-th first elastic members, deformably connected between the first to n-th load application members and the first to n-th load acting members, respectively.

Here, n is an integer which is 3 or more. No load is applied on the first to n-th load application members, when a distance between the movable member and the side edge aligner is a first distance. First to n-th loads are applied on the first to n-th load application members, and first to n-th urging forces for urging the side edge aligner toward the side edges of the stacked sheets act on the first to n-th load acting members in order, when the distance between the movable member and the side edge aligner increases from the first distance by L1, L2 . . . Ln (L1<L2< . . . <Ln).

In this configuration, when the first to n-th elastic members are extended in the named order, in accordance with the distance of the movable member travels, a greater load is gradually impose on the side edge aligner. Therefore, the side edge aligner is impelled toward the side edges of the sheets by a steadily increasing force, and the degree of alignment, produced by the pressure applied to the side edges of the sheets, is gradually increased.

Preferably, the first to n-th load acting members are provided as first to n-th slots extending in a movable direction of the movable member, respectively. The first to n-th elastic member are tension springs, one ends of which are formed with hook members respectively hooked over the first to n-th slots with clearances L1, L2, . . . Ln, and the other ends of which are fixed to the first to n-th load acting members.

In this configuration, when the movable member is shifted, the clearance L1 at the end of the first tension spring is removed and the end engages with the first slot, so that the first tension spring is extended. Since the clearance lengths L1 to Ln increase in numerical order, as the shifting of the movable member continues, the clearances of the tension springs are removed and the springs are extended in order, from the second to the n-th. Therefore, the urging force that impels the side edge aligner and presses it against the side edges of the sheets is respectively and gradually increased in accordance with the distance traveled by the movable member.

Alternatively, the first to n-th load acting members are provided as first to n-th slots extending in a movable direction of the movable member, respectively. The first to n-th elastic members are tension springs, one ends of which are formed with hook members respectively hooked over the first to n-th slots with clearances L1, L2, . . . Ln, and the other ends of which are fixed to the first to n-th load application members.

Alternatively, the first to n-th load application members are provided as first to n-th application-side slots extending in a movable direction of the movable member, respectively. The first to n-th load acting members are provided as first to n-th acting-side slots extending in a movable direction of the movable member, respectively. The first to n-th elastic member are tension springs, one ends of which are formed with hook members respectively hooked over the first to n-th application-side slots, and the other ends of which are formed with hook members respectively hooked over the first to n-th acting-side slots. Additional clearances between the both hook members and the associated slots in the first to n-th elastic members are L1, L2, . . . Ln.

Preferably, the paper feeding device further comprises a cassette holder, to which the cassette member is detachably inserted. The movable member is moved such that only the first to n-th urging forces are added in order as a resultant urging force applied to the side edge aligner, then the n-th to first urging force is reduced in order from the resultant force.

In this configuration, an increasing load is gradually imposed by the first to the n-th elastic members, and the side edges of the sheets are aligned by the pressure applied by the side edge aligner. Then, the load imposed by the elastic members is gradually reduced. Thus, the pressure applied to the side edges of the sheets is reduced while the aligned state of the sheets is maintained and the resistance is reduced when a sheet is fed from the cassette member.

DETAILED DESCRIPTION OF THE PREFERRED EMBODIMENTS

Figure 1:
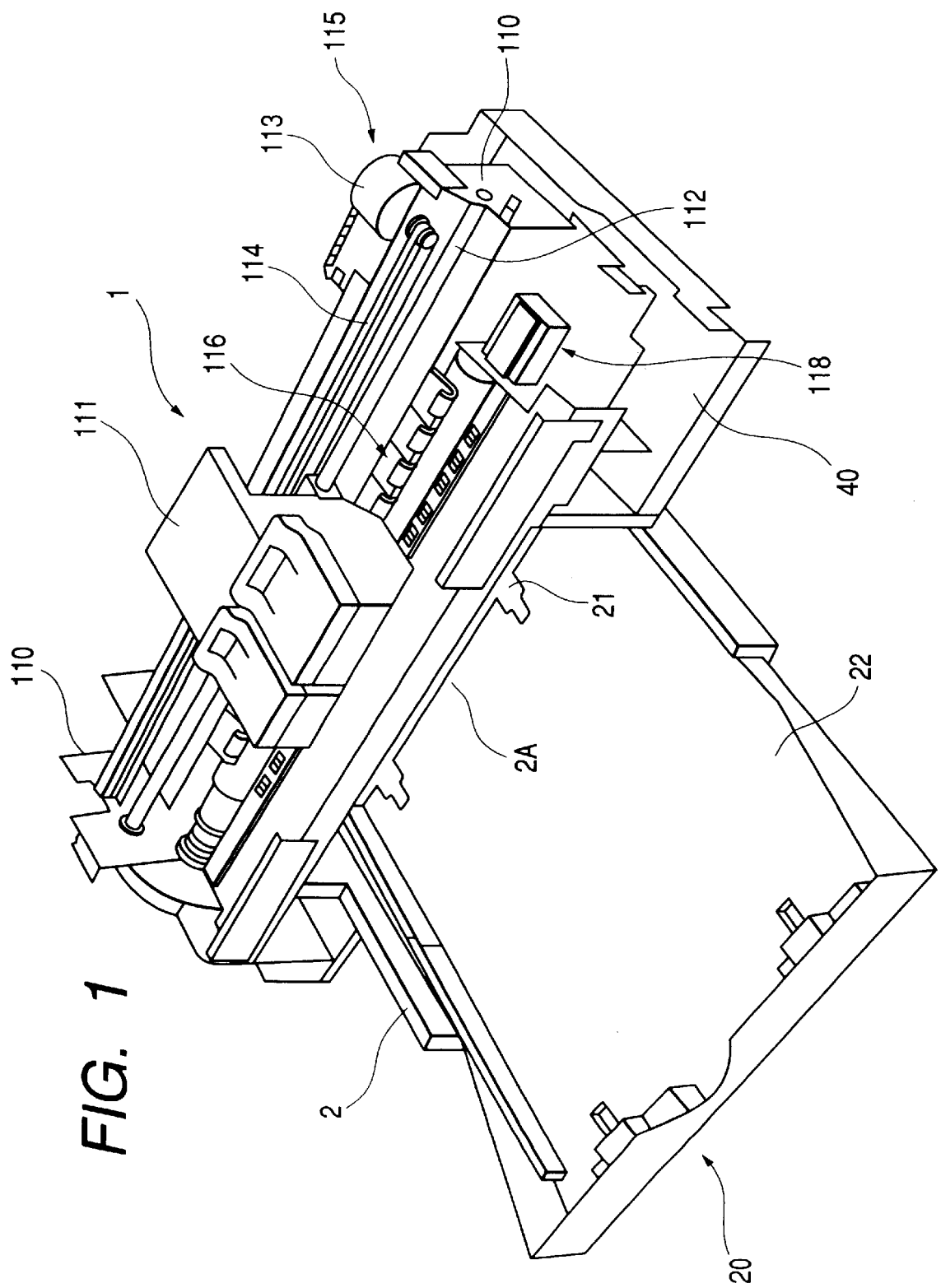
FIG. 1 is a perspective view of a printer of according to the present invention wherein an urging device having a multiple loading member is employed as a paper feeding device.
Figure 2:
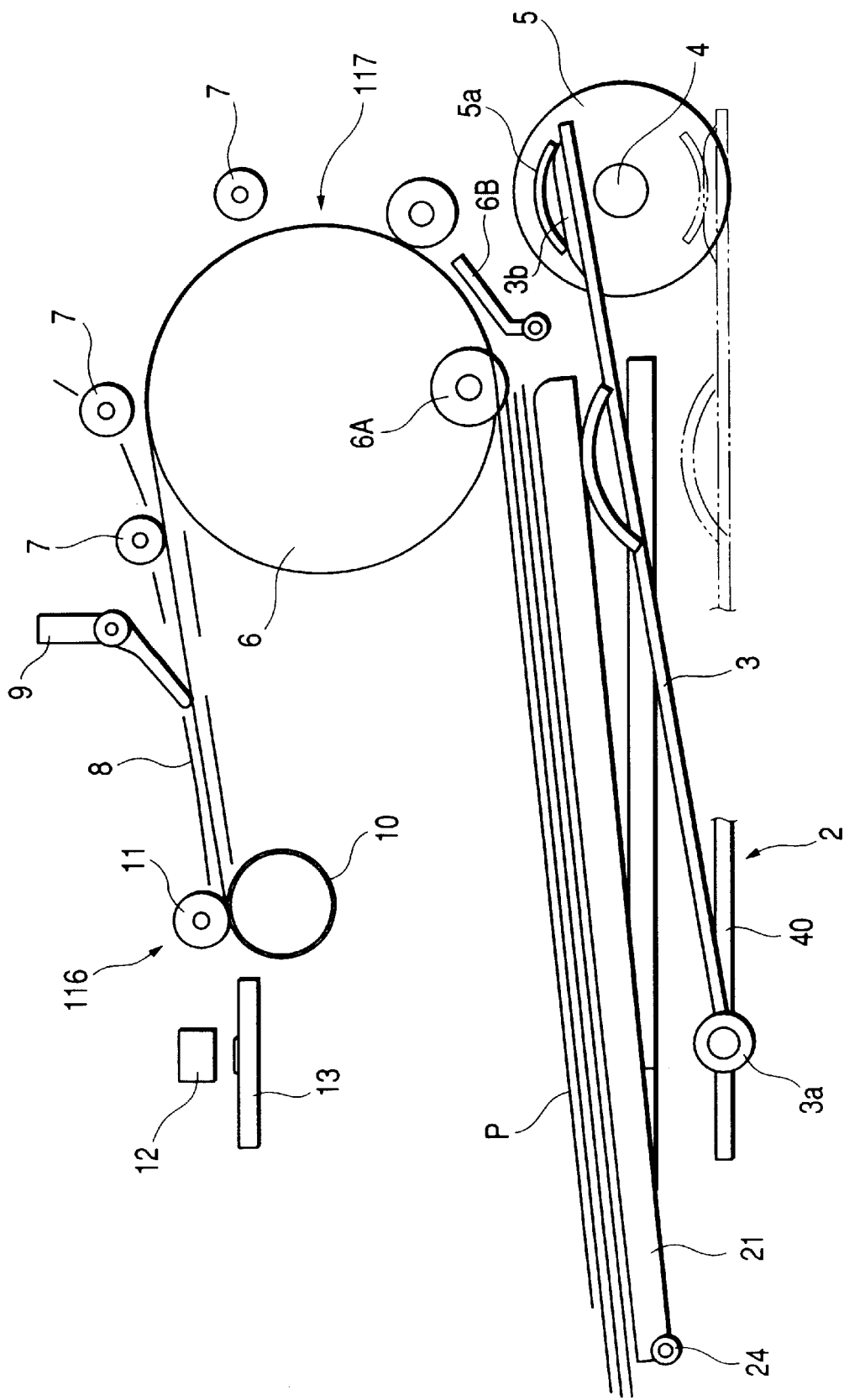
FIG. 2 is a specific diagram showing the paper feeding device in the printer.

The preferred embodiment of the invention will now be described. FIG. 1 is a perspective view of a printer, without a cover, wherein an urging device including a multiple loading member, according to the invention, is employed as a paper feeding device. FIG. 2 is a specific diagram showing the paper feeding device in the printer.

The schematic arrangement of the printer will now be described. A printer 1 comprises a paper cassette attachment unit 2, for which a paper cassette insertion port 2A is formed in the front face of the main body of the printer 1; a paper cassette 20, which is inserted through the paper cassette insertion port 2A and in which plural sheets P are stacked; and a main frame 110, which is mounted upright on a bottom frame 40 and in which are provided: a main shaft 112 along which a carriage 111 on which a recording head 12 is mounted is moved in the main scanning direction, a carriage driver 115 that includes a drive motor 113 and a belt 114 for moving the carriage 111, a conveying unit 116 for the sheets P, a paper feeding unit 117 located at the rear in the main body, and a carriage home position 118 for providing such maintenance as the cleaning of the recording head 12 and ink suction.

In the paper cassette attachment unit 2, as is shown in FIG. 2, provided on the side of the paper cassette insertion port 2A is a lifting plate operating lever 3, for which a rotation fulcrum 3a is mounted on the bottom frame 40, that extends rearward to a location in the vicinity of a paper feed roller 6 and that is impelled upward, toward the paper feed roller 6, by a spring (not shown). When a cam 5a of a cam member 5, which is fitted over a release shaft 4, acts on a cam follower 3b formed on the operating lever 3, each time a sheet of the paper P is fed the operating lever 3 raises a lifting plate 21 to an elevated position (paper feeding state) in FIG. 2 and then lowers it to its original position (non-feeding state). That is, when the release shaft 4 is rotated as paper feeding is initiated, a separation pad 6B is pressed against the paper feed roller 6, and the lifting plate 21, pivoted at a shaft 24, is raised toward the paper feed roller 6 by the operating lever 3. Thus, the leading edge of the upper sheet P is brought into contact with the feed roller 6.

The upper sheet P in the paper cassette 20 is separated by the separation pad 6B, and while being fed by the paper feed roller 6 is guided along a paper guide roller 7 and a paper guide unit 8. The sheet P is detected by a paper detector 9 after its leading and trailing edges have passed the paper detector 9, and is then conveyed forward by a conveying unit 116 constituted by a drive roller 10 and a coupled roller 11. Sequentially, upon the detection of the sheet P, control of the conveying roller 10 is provided to feed the head of the sheet P, and in accordance with the recording timing, the sheet P is transported to a recording area whereat the recording head 12 and a platen 13 are located. Thereafter, the sheet P is printed, and is discharged.

Figure 3:
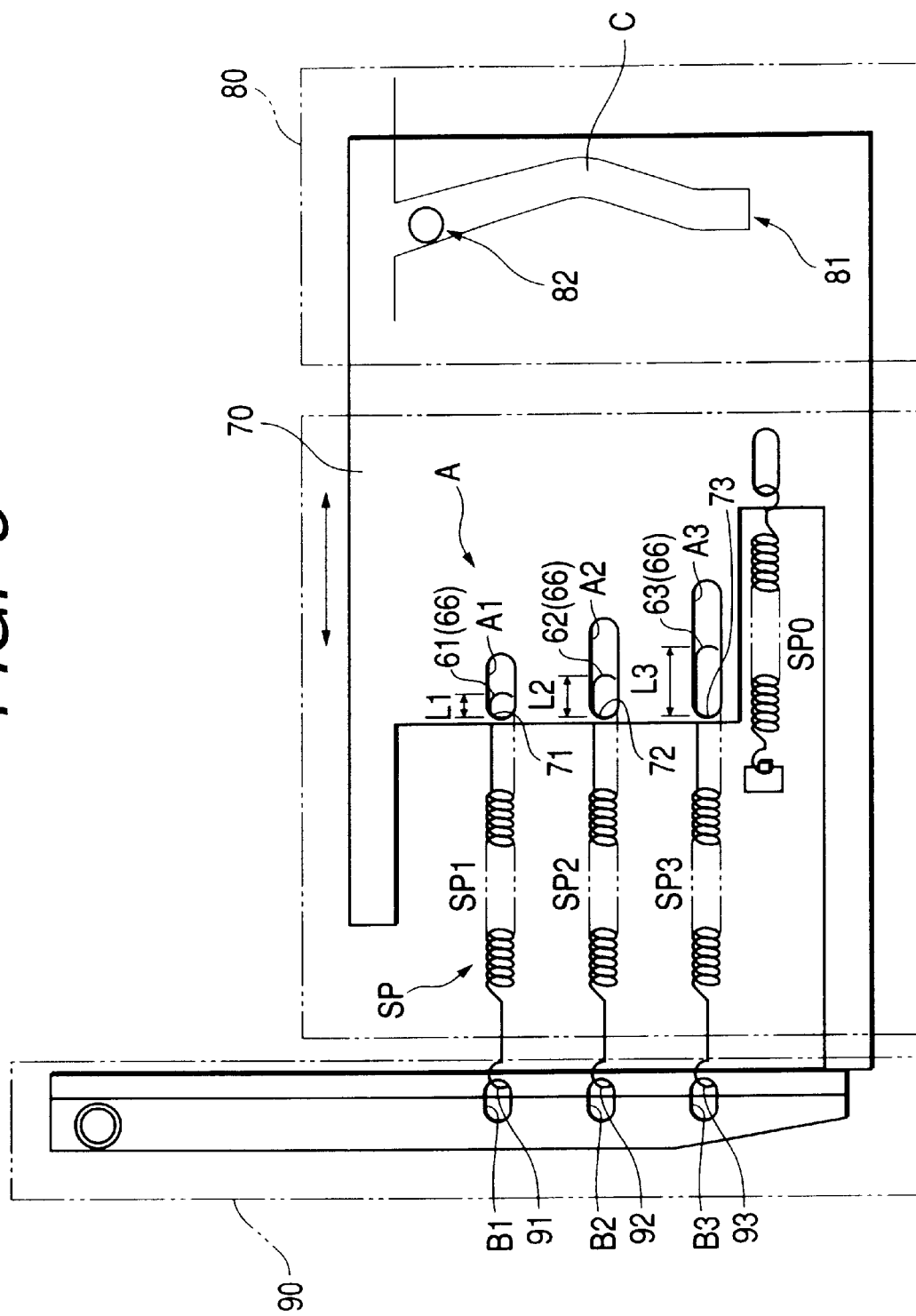
FIG. 3 is a conceptual diagram showing the urging device having the multiple loading member.

The urging device of this invention will now be described in detail. FIG. 3 is a conceptual diagram showing the urging device of the invention.

In the urging device, the loading member includes multiple springs SP (SP1, SP2 and SP3), each of which is connected at one end to a corresponding aligning member connector (B1, B2 or B3), and a load controller 80 imposes, on an applicator unit 90, multilevel loads by combining the elastic force of the springs SP in the loading member. To engage the other ends of the springs SP, the loading member includes a movable unit 70 that is positioned so it is movable in the direction (indicated by arrows in FIG. 3) in which the spring load is generated. In the movable unit 70, spring holder units A (A1, A2 and A3) (corresponding to movable member connectors) mounted in slots having different lengths, are provided for individual springs. Different lengths (L1, L2 and L3) between spring ends 61, 62 and 63 (hooked, U-shaped distal ends) and load imposition edges 71, 72 and 73, which are portions that the springs actually engage when they are extended, are required in order to delay the application of the elastic force produced by each spring. As example arrangements for the spring holder units A and the spring ends, slots, extended in the direction in which spring loads are generated, are formed in the movable unit 70 for the spring holder units A. As the spring ends, long hooks 66 are formed in the direction in which the springs are extended or contracted, and clearance lengths (size differences L1, L2 and L3) are defined that must be traversed before the hooks 66 engage the imposition edges in the slots. In this embodiment, the lengths L1, L2 and L3 increase in order and correspond to the spring holder units A1, A2 and A3.

Specifically, when no tension is applied to the springs S1 to S3, the clearance lengths L1 to L3 represent the distances the movable unit 70 must travel in the spring extension direction before the spring holder units A engage the imposition edges of the slots and extension of the springs is begun. Since the lengths L1, L2 and L3 are increased in order, and correspond to the spring holder units A1, A2 and A3, the spring load of the spring SP1 begins to act on the applicator unit 90 when the movable unit 70 is moved a distance equivalent to the length L1 in the direction in which the spring is extended. When the movable unit 70 is thereafter moved a total distance equivalent to the length L2 in the spring extension direction, the spring load produced by the spring SP2 is imposed in addition to the spring load produced by the spring SP1. Further, when the movable unit 70 is then moved a total distance equivalent to the length L3 in the spring extension direction, not only the spring loads produced of the springs SP1 and SP2, but in addition, the spring load produced by the spring SP3 is additionally imposed. It should be noted that the aligning member connectors (B1, B2 and B3) in the applicator unit 90 are also formed as slots, and the edges nearest the movable unit 70 are load imposition edges 91, 92 and 93.

In this embodiment, one end of a spring SP always engages one of the load imposition edges, 91, 92 or 93. It should be noted that, in FIG. 3, the functions of the aligning member connectors (B1, B2 and B3) in the applicator unit 90 may be exchanged for those of the spring holder units A1, A2 and A3 in the movable unit 70. That is, in the spring holder unit A1, A2 or A3, the other end of each spring is always positioned on the side of the load imposition edge 71, 72 or 73, and the clearance (the different lengths L1, L2 or L3) may be defined, which is required until the aligning member connector (B1, B2 or B3) engages the slot. Further, the clearance may be defined both for the aligning member connectors (B1, B2 and B3) of the applicator unit 90 and the spring holder units A1, A2 and A3, and the sums of the clearances may be the lengths L1, L2 and L3.

Figure 4:
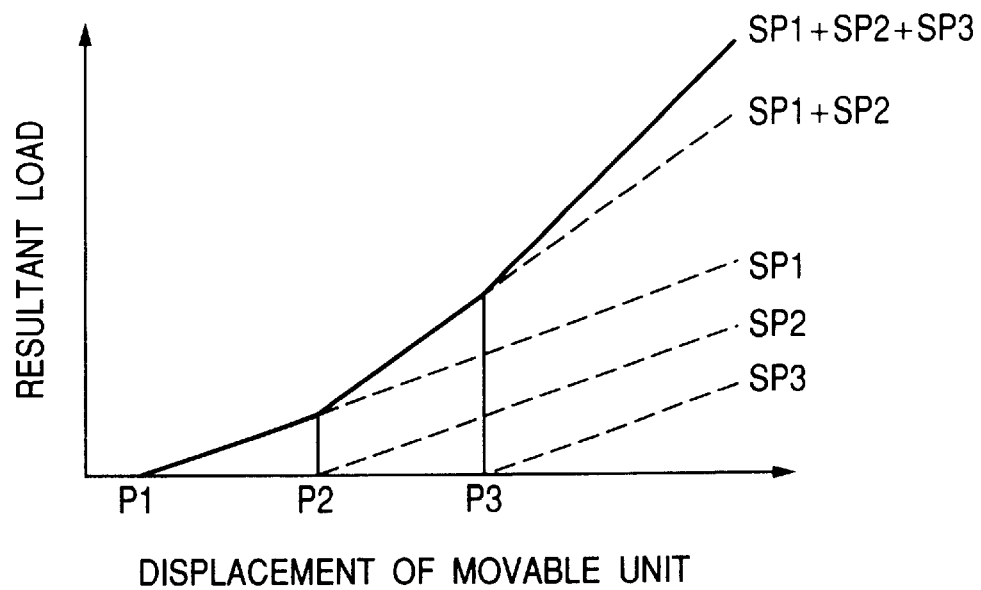
FIG. 4 is a graph showing the relationship between a resultant spring load exerted by multiple springs, and the displacement of a movable unit.

A detailed explanation will now be given, while referring to FIG. 4, for the processing whereby the spring loads produced by the springs SP1, SP2 and SP3 are gradually imposed on the applicator unit 90. FIG. 4 is a graph showing the relationship between the resultant spring loads SP1, SP2 and SP3, and the displacement of the movable unit 70. In order to easily understand the urging device, it must be understood that the multiple springs exert the same spring pressure. The locations whereat the spring loads begin to be imposed on to the applicator unit 90 are P1 for the spring SP1, P2 for the spring SP2 and P3 for the spring SP3, in accordance with the displacement of the movable unit 70 as it travels in the direction in which the springs SP are extended. It should be noted that in FIG. 3 the spring SP0 is used to return the movable unit 70 to the reference position, and that, for convenience sake, each of the distance between the movable unit 70 and the applicator unit 90 in a state shown in FIG. 3 is defined as a first distance.

When the movable unit 70 in FIG. 4 is shifted by the load controller 80 the distance L1 to the right, at the point P1, urging force equivalent to the load produced by the spring SP1 is applied to the applicator unit 90. Then, when the movable unit 70 is moved from the state in FIG. 3 the distance L2, the load produced by the spring SP2 is imposed at point P2, and the applicator unit 90 is pulled by the resultant load applied by the springs SP1 and SP2. When the movable unit 70 is shifted away from the state in FIG. 3 the distance L3, the applicator unit 90 is pulled by the resultant load applied by three springs, including the load produced by the spring SP3. When the processing sequence for imposing the spring load for pulling the applicator unit 90 is stored in the load controller 80, this manner can be applied as the operating unit for various types of apparatuses.

Figure 5:
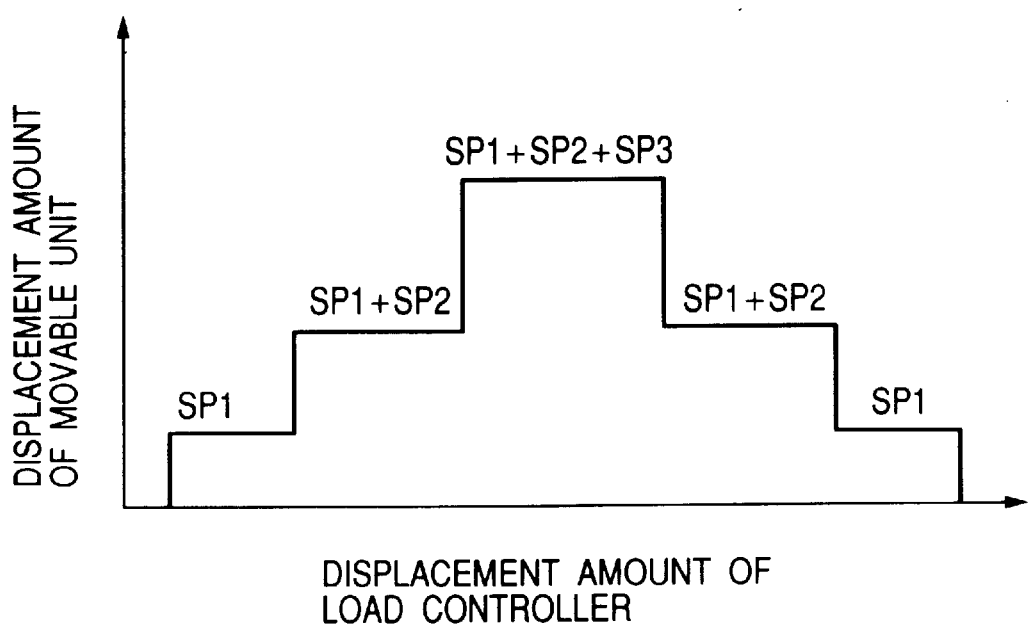
FIG. 5 is a graph showing the relationship between the displacement amount of a load controller and the displacement amount of the movable unit.

The process sequence performed by the load operation unit 80 for imposing the spring load will now be described by using the three springs in FIG. 3. FIG. 5 is a graph showing the relationship between the operating distance for the load controller 80 and the displacement of the movable unit 70. The load controller 80 of the embodiment is a mechanism constituted by a groove cam 81 and a boss (cam follower) 82, and the process sequence for imposing a spring load is performed along the shape of the groove cam 81. The operating distance for the load controller 80 is the distance that the boss 82 moves along the groove cam 81 in the direction perpendicular to the direction in which the movable unit 70 is displaced. Since the groove cam 81 is curved as is shown in FIG. 3, the load imposed on the applicator unit 90 is changed as follows.

When the boss 82 is moved along the cam face of the groove cam 81 and the movable unit 70 is shifted the distance L1 from the state in FIG. 3, the spring SP1 first acts on the applicator unit 90, and when the movable unit 70 is moved the distance L2, the spring SP2 also acts on the applicator unit 90, which is pulled by the resultant spring load. Then, when the movable unit 70 is moved the distance L3, the spring SP3 acts on the applicator unit 90, which is pulled by the resultant spring load applied by the three springs. At this time, the maximum load is imposed on the applicator unit 90. Thereafter, when the boss 82 passes the crest C in the curved groove cam 81, the displacement of the movable unit 70 is reduced, so that the spring loads applied by the springs SP1 to SP3 are released in the reverse order from the above operation. When the boss 82 reaches the terminal point D, only urging force provided by the spring SP1 is maintained.

In this embodiment, three springs are provided for the movable unit 70. However, the number of springs and the spring pressure can be arbitrarily selected. Further, although only one movable unit 70 is employed, multiple movable units may be employed.

Figure 6:
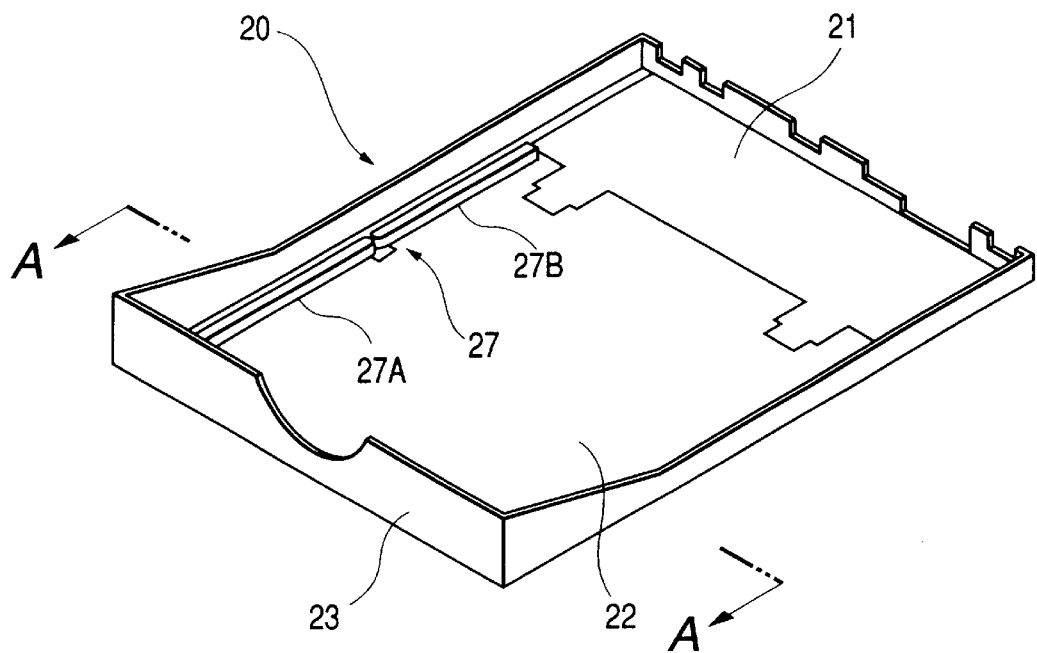
FIG. 6 is a perspective view, viewed from a paper storage unit, of a paper cassette in the paper feeding unit of the invention.
Figure 7:
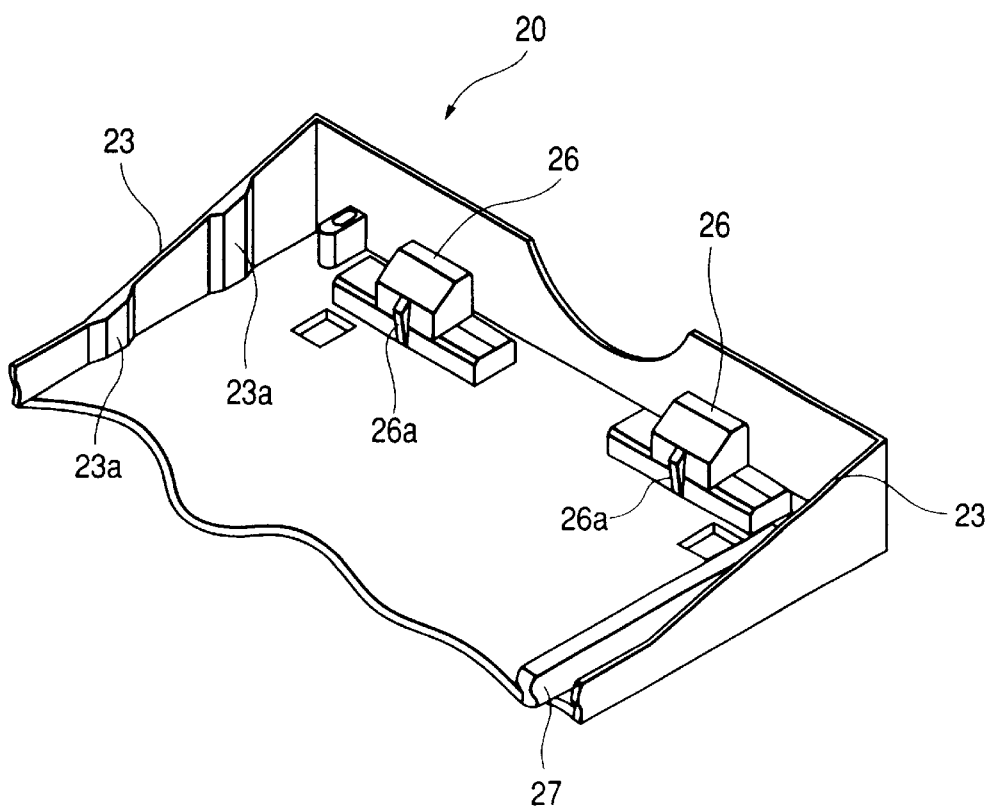
FIG. 7 is a diagram viewed from an A—A arrow in FIG. 6.
Figure 8:
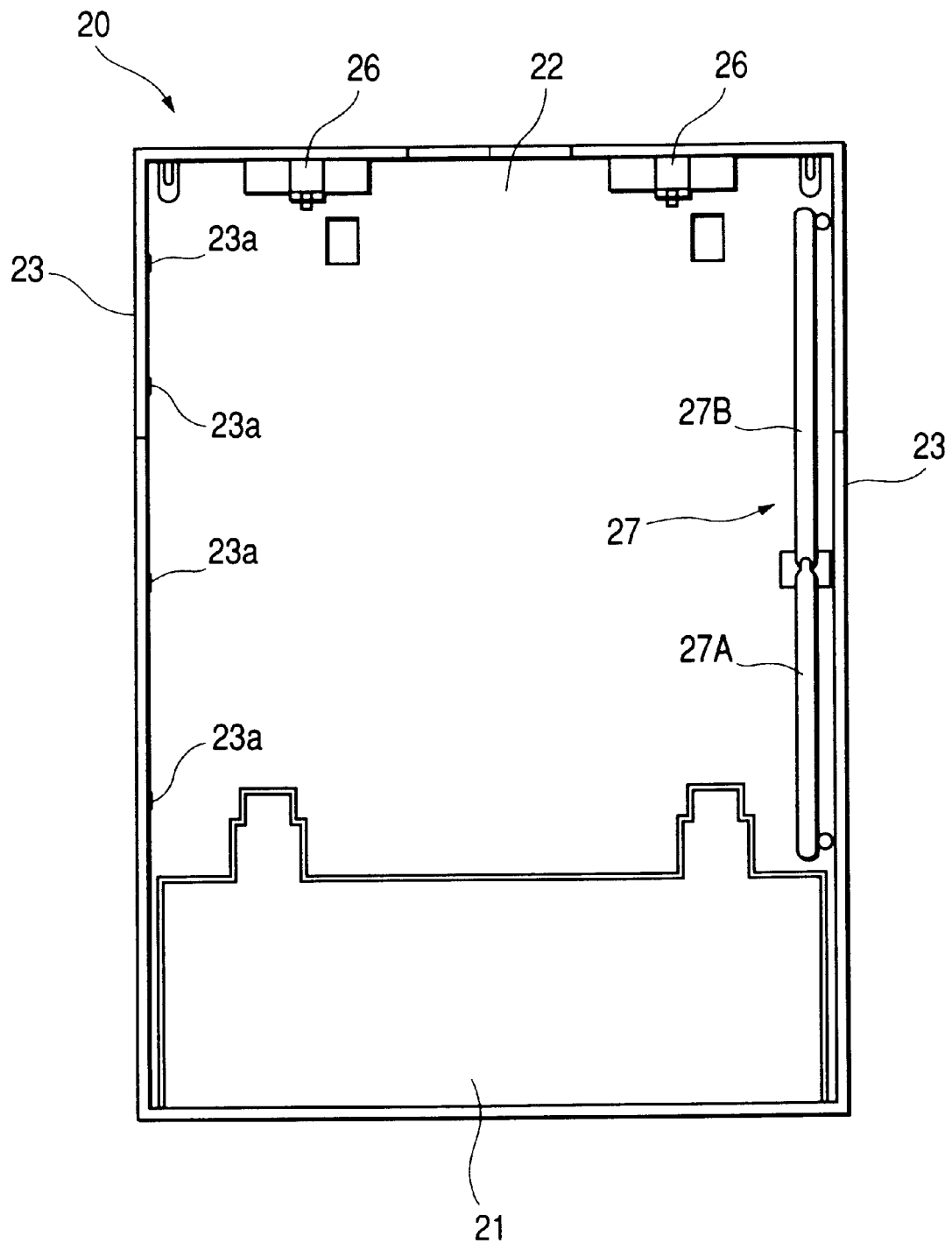
FIG. 8 is a plan view of the paper cassette of FIG. 6.
Figure 9:
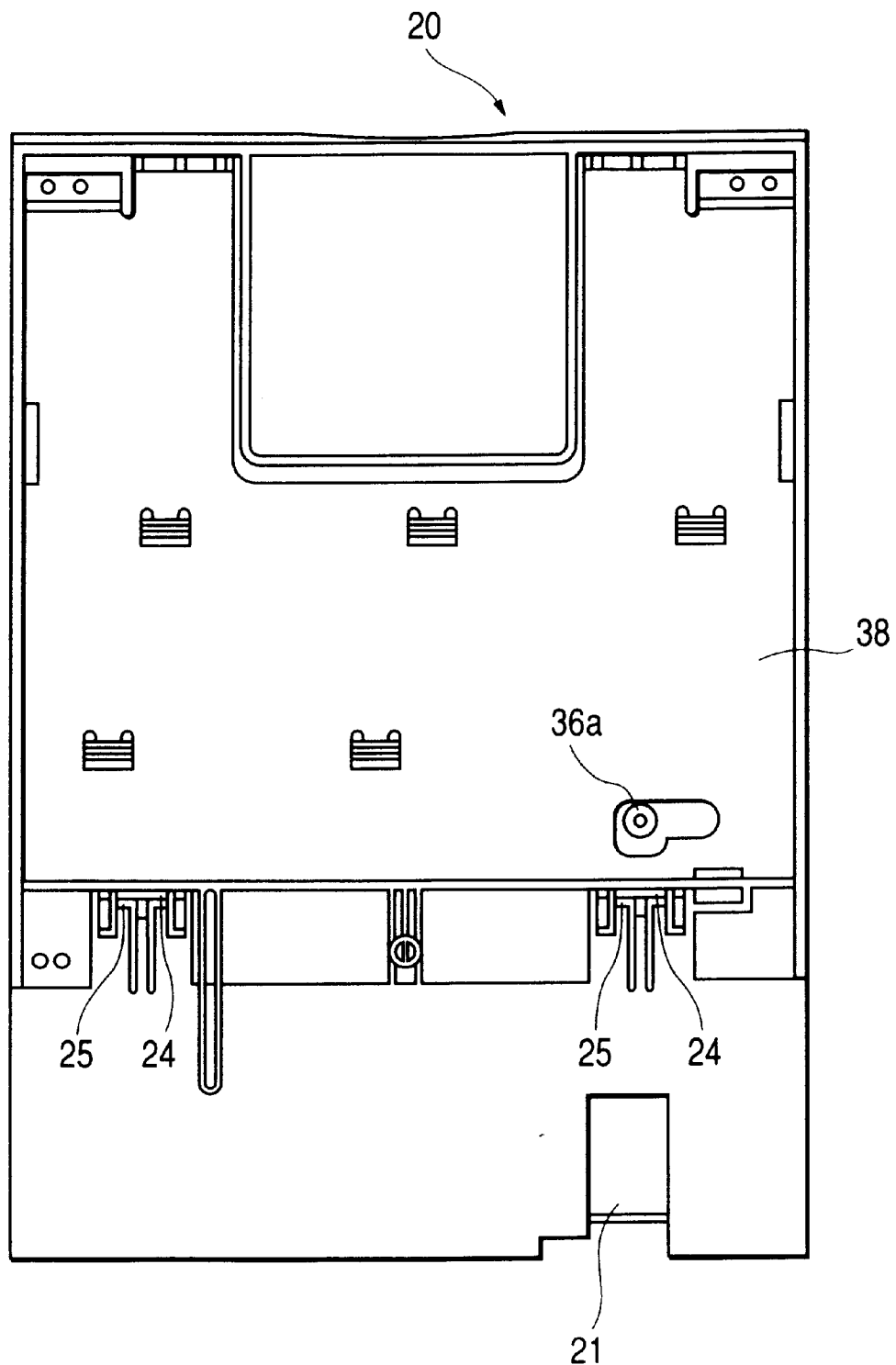
FIG. 9 is a rear view of the paper cassette of FIG. 6.
Figure 10:
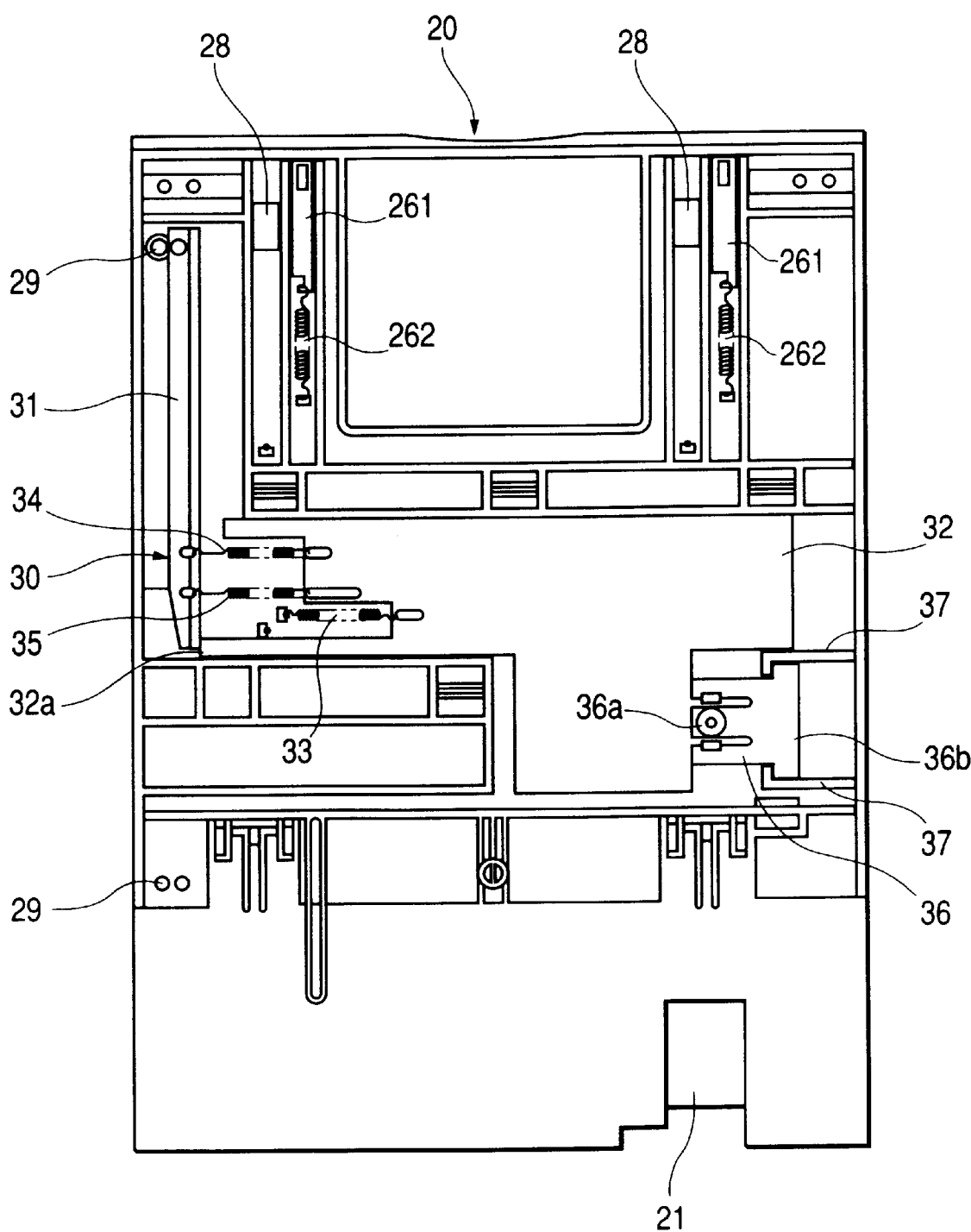
FIG. 10 is a rear view of the paper cassette from which a bottom cover in FIG. 9 has been removed.

An explanation will now be given for the paper cassette in the paper feeding device that employs the urging device. FIG. 6 is a perspective view, from the paper storage unit side, of a paper cassette in the paper feeding device that employs the urging device of this invention. FIG. 7 is a diagram viewed from A—A arrow. FIG. 8 is a plan view of the paper cassette, and FIG. 9 is a bottom view of the paper cassette. FIG. 10 is a bottom view of the paper cassette from which a bottom cover has been removed.

In FIG. 6, the paper cassette 20 is a boxed shaped container constituted by a bottom plate 22 and side walls 23 positioned around the perimeter of the bottom plate 22. The lifting plate 21, located at the front of the paper cassette 20, lifts the stacked sheets P toward the paper feed roller 6, and a lifting plate shaft 24 (FIGS. 2 and 9) is rotatably supported by bearings 25 (FIG. 9) on the bottom plate 22, so that the lifting plate 21 can be moved upward along the front, wide wall portions of the paper cassette 20.

As is shown in FIG. 7, at the rear of the paper cassette 20, a pair of trailing edge guides 26 are separately located from the side walls 23 while extending parallel therewith. Each of the trailing edge guides 26 is provided with a contact portion 26a on which the trailing edges of the stacked sheets P are abutted.

A side edge aligner 27 is provided behind the lifting plate 21 along one of the side walls of the paper cassette 20. Multiple protrusions 23a provided on the other side wall are contacted by the side edges of the sheets P. The protrusions 23a are located behind the lifting plate 21 and along the side wall 23, facing the side edge aligner 27.

As is shown in FIG. 10, the mechanisms for the trailing edge guides 26 and the side edge aligner 27 are provided on the back face of the paper cassette 20. As is shown in FIG. 9, a bottom cover 38 is attached to cover the mechanism.

In FIG. 10, the trailing edge guides 26 is coupled with slide plates 261 that is movably located on the rear face of the paper cassette 20. Springs 262 are extended between the slide plates 261 and the back face, and are urged toward the front side of the paper cassette 20. Each of the contact portions 26a of the trailing edge guides 26 has a face that is inclined toward the bottom plate 22 at the rear of the paper cassette 20, and this inclined face is brought into contact with the trailing edges of the sheets by the force exerted by the spring 262. Therefore, the upper sheets P are moved further forward than the sheets P nearer the bottom plate 22, and are pushed against the front side walls 23 of the paper cassette 20. The sheets P are separated and individually fed by the feed roller 6 and the pad 6B. Here, the reference numeral 28 denotes through holes.

As is shown in FIG. 8, the side edge aligner 27, which is located along one of the side walls 23 of the paper cassette 20, pushes against one side edge of the stacked sheets P, and aligns the side edges of the sheets P along the other side wall 23 (on the side on which the protrusions 23a are mounted). The side edge aligner 27 includes a first part 27A and a second part 27B, and is located along the side wall 23. The ends of the first part 27A and the second part 27B are coupled with a bar 31 located on the back face of the paper cassette 20, and substantially constitute the middle portion of the side edge aligner 27. The other ends of the parts 27A and 27B are impelled by an urging mechanism 30 located on the back face of the paper cassette 20, nearer the side wall 23 where the side edges of the sheets are aligned.

As is shown in FIG. 10, the urging mechanism 30 includes the bar 31, a movable plate 32 and springs 33, 34 and 35. The bar 31 is connected to the ends of the first and the second parts 27A and 27B, and is rotatably attached along the side wall 23 of the paper cassette 20. The movable plate 32 is so provided that it slides in the direction perpendicular to the direction in which the paper cassette 20 is inserted. A boss plate 36, on which is a sheet aligning boss 36a, is integrally formed with the side wall opposite the side wall along which the bar is extended. An expanded portion 36b of the boss plate 36 is guided along a plate guide 37 located on the rear face of the paper cassette 20, and contacts the L-shaped distal end of the guide 37, so that movement of the boss plate 36 toward the bar 31 is suppressed.

The spring 33 is extended between the bottom plate 22 and the movable plate 32, and multiple (two in this embodiment) springs 34 and 35 are extended between the bar 31 and the movable plate 32. As is shown in FIG. 10, when the spring 33 pulls the movable plate 32, the boss plate 36 is brought into contact with the L-shaped portion of the plate guide 37, so that the movable plate 32 is secured. At this time, the inward movement of the bar 31, which pushes against the side edges of the sheets, is halted by the extended portion 32a of the movable plate 32, and the springs 34 and 35 do not act on the bar 31, and the side edge aligner 27 is located at the position shown in FIG. 8 and can only be moved outward. Since the interval between the side edge aligner 27 and the nearer side wall 23 (on the protrusion 23a side) is set at a width greater than the width of the paper, the side edge aligner 27, while in the state shown in FIG. 8, does not interfere with the storage of the sheets.

When the paper cassette 20 is to be attached to the paper cassette attachment unit 2, during the insertion of the paper cassette 20, either a single load or a resultant load produced by the springs 34 and 35 is imposed. The mechanism is constituted by the boss 36a of the boss plate 36 and a bent 41 (see FIG. 11) formed on the bottom frame 40 of the paper cassette attachment unit 2.

An explanation will now be given for the paper side edge aligning processing when the paper cassette 20 is attached.

Figure 11:
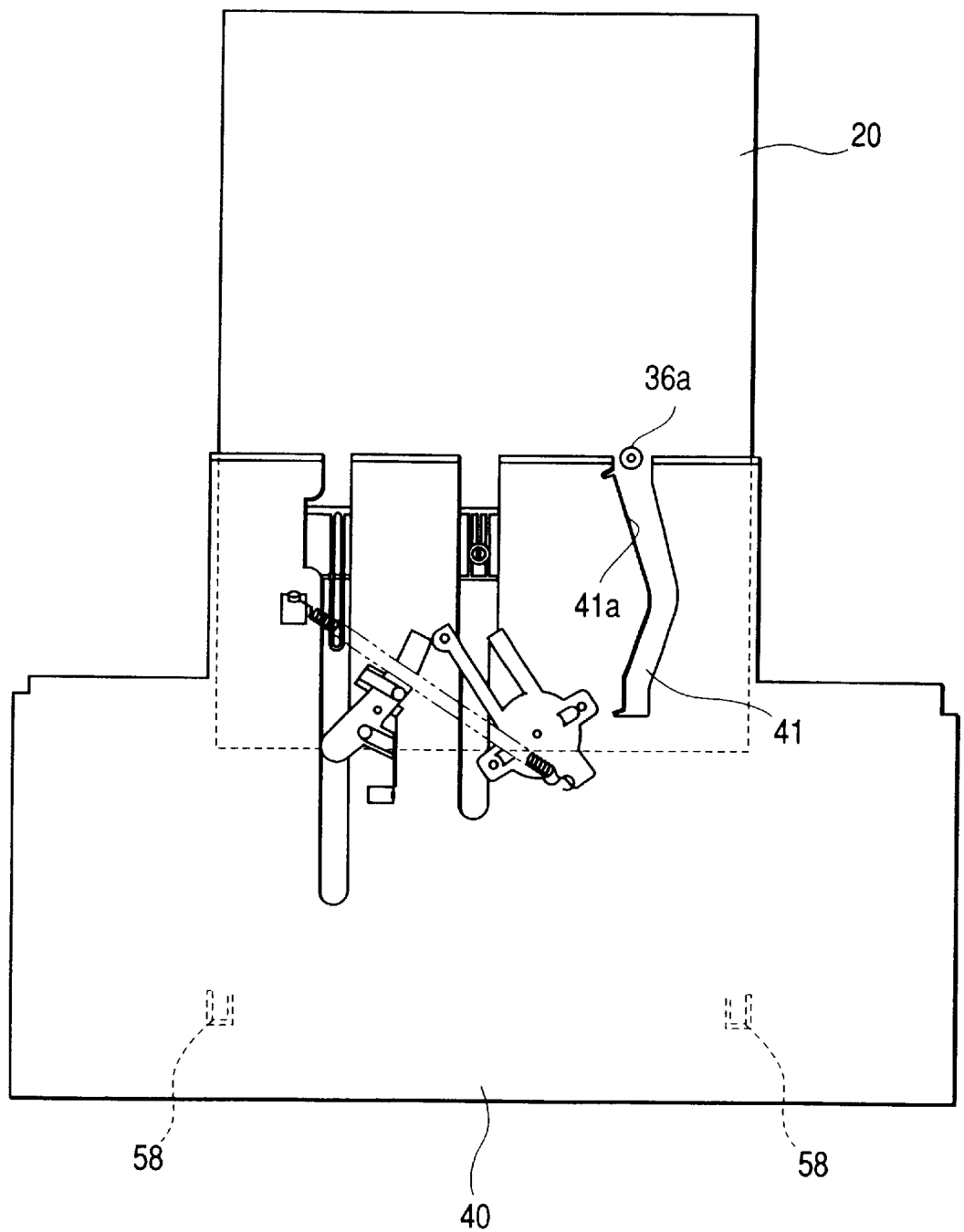
FIG. 11 is a diagram showing the relationship between a paper aligning boss and a groove cam.

When the paper cassette 20 is inserted into the paper cassette attachment unit 2, as is shown in FIG. 11, the paper aligning boss 36a is guided while in contact with the face 41a of the groove cam 41. When the boss 36a is guided into the groove cam 41, upon the shifting of the movable plate 32 to the right in FIG. 10, the right end of the spring 34 substantially engages the end of the spring holder unit. Thus, the spring 34 is extended, and, in reaction, exerts an urging force to rotate the bar 31 counterclockwise in FIG. 10. As the bar 31 is pivoted counterclockwise, the side edge aligner-27 is inclined toward the sheets, and presses against the sheets and aligns their side edges.

Figure 12:
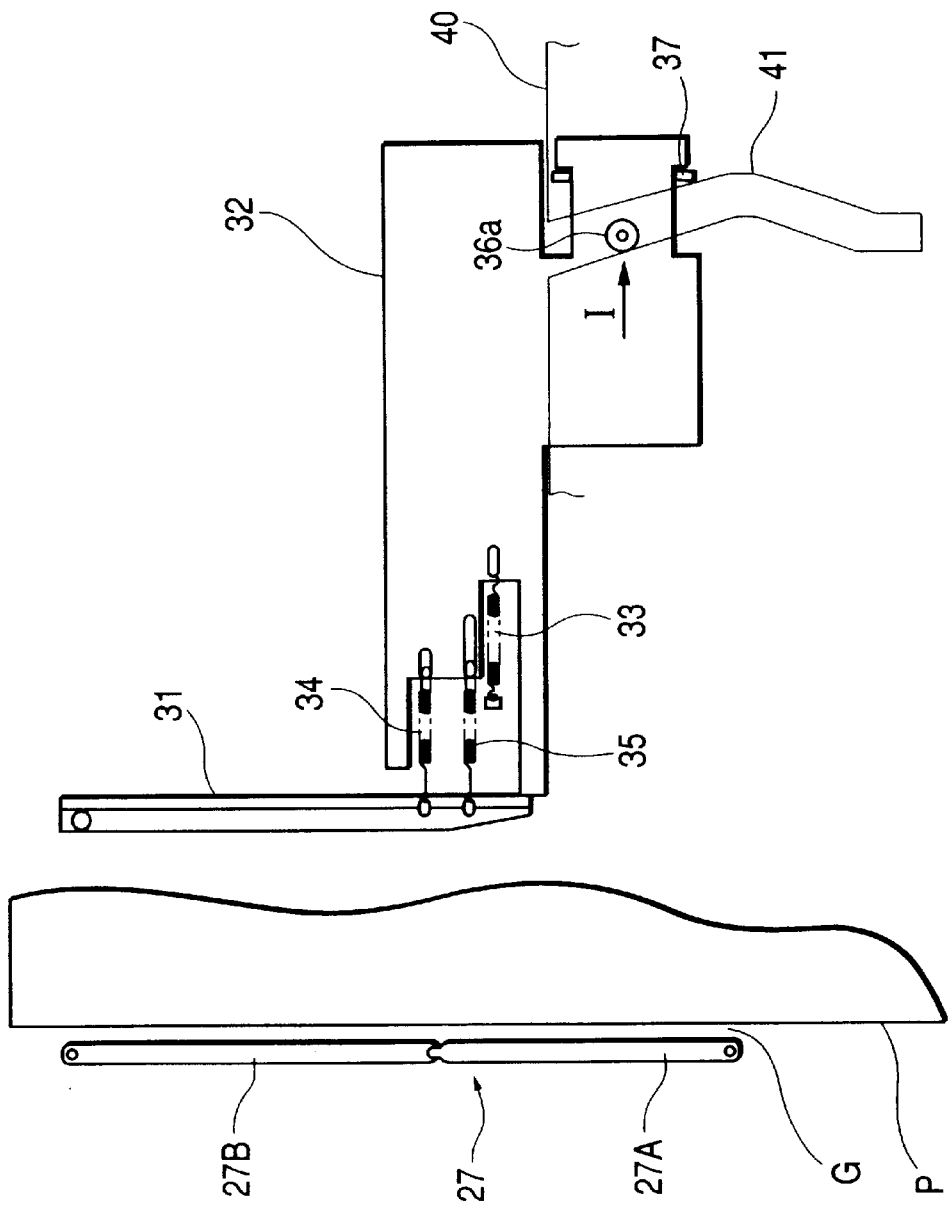
FIG. 12 is a diagram for explaining the state wherein the force produced by one spring has begun to be applied in the paper side edge aligning process.
Figure 13:
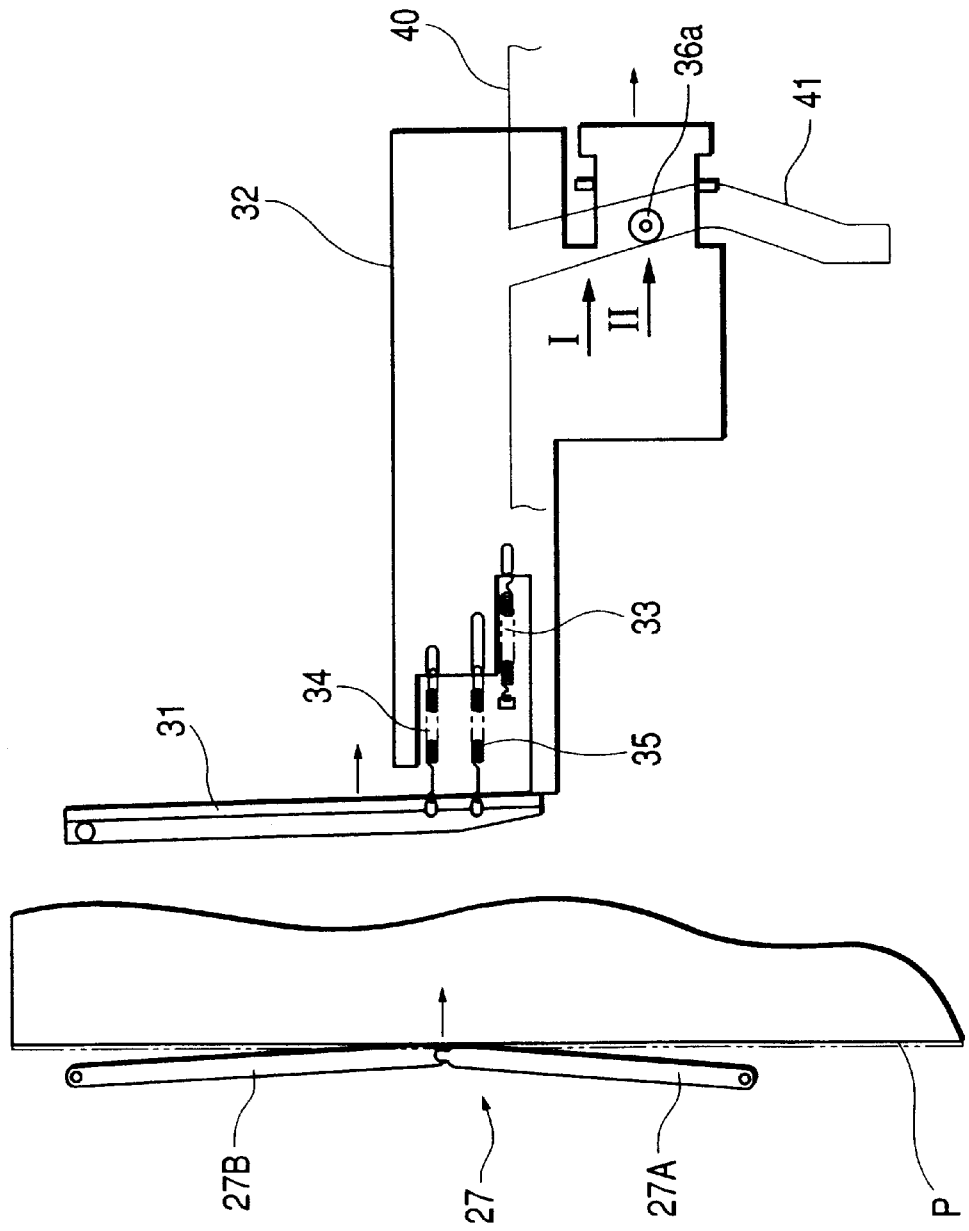
FIG. 13 is a diagram for explaining the state where the force produced by the spring is being applied in the paper side edge aligning process.

This pressing force is actively applied when the boss 36a is moved from location I in FIG. 12 to location II in FIG. 13. Following this, when the paper cassette 20 is inserted, the right end of the spring 35 substantially engages the end of the spring holder unit. Thus, the spring 35 begins to be extended, and in addition to the urging force produced by the spring 34, the urging force produced by the spring 35 acts as a reactive force on the bar 31. As a result, since the side edge aligner 27 is to be inclined inward toward the paper side edge side with greater force, the force applied to the paper side edges is increased to align the side edges.

Figure 14:
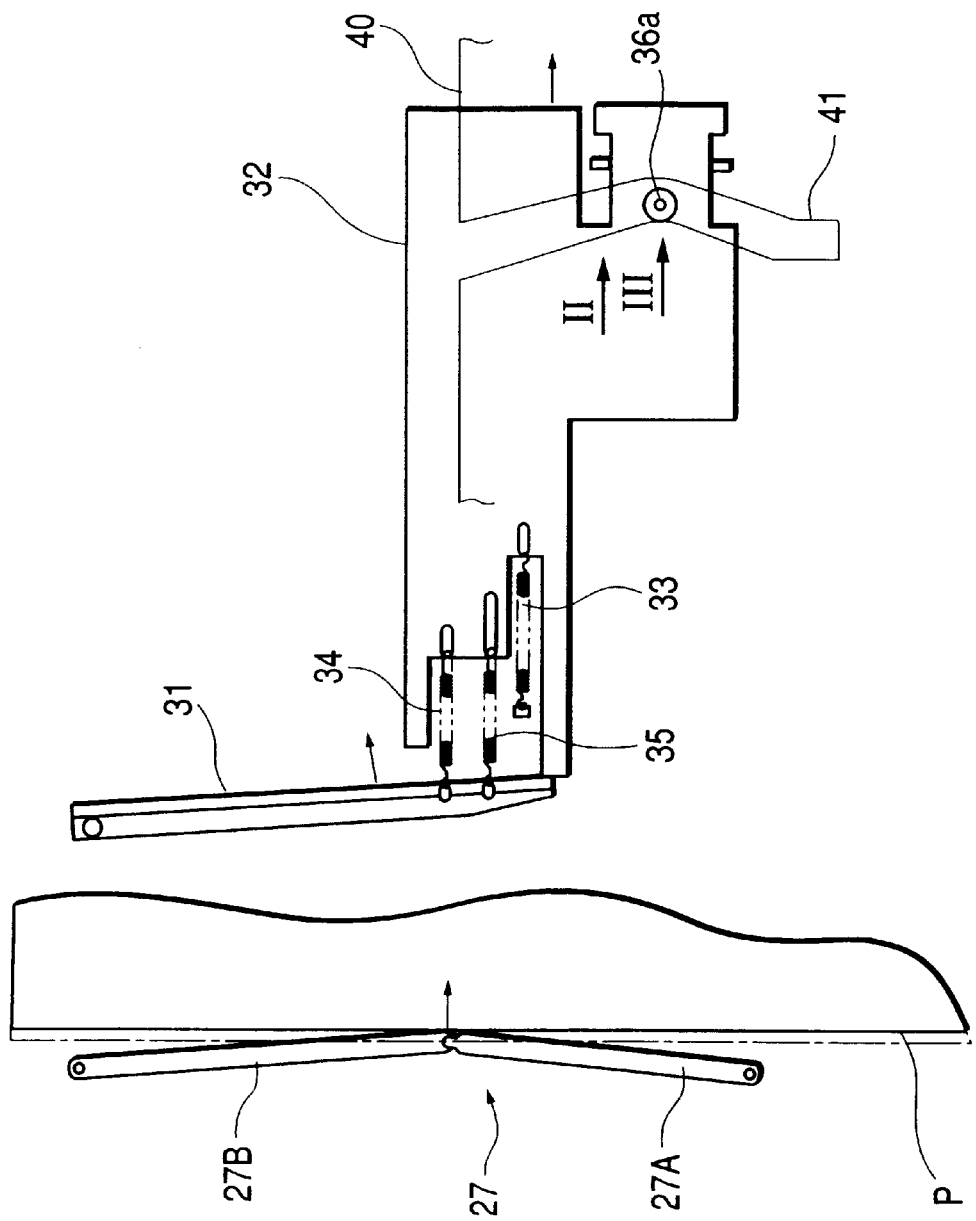
FIG. 14 is a diagram for explaining the state wherein the force produced by two springs is being applied to align the side edges of sheets in the paper side edge aligning process.

When the boss 36a is moved from location 11 in FIG. 14 to location III, this state is maintained. The pressing force at this time reaches the maximum when the boss 36a is located at position III. When the paper cassette 20 is inserted further, and the boss 36a passes through location III, the direction of travel of the movable plate 32 is changed toward the left in FIG. 15. Thus, the distances the springs 34 and 35 are extended are reduced, and the urging forces they produce begin to decrease.

Figure 15:
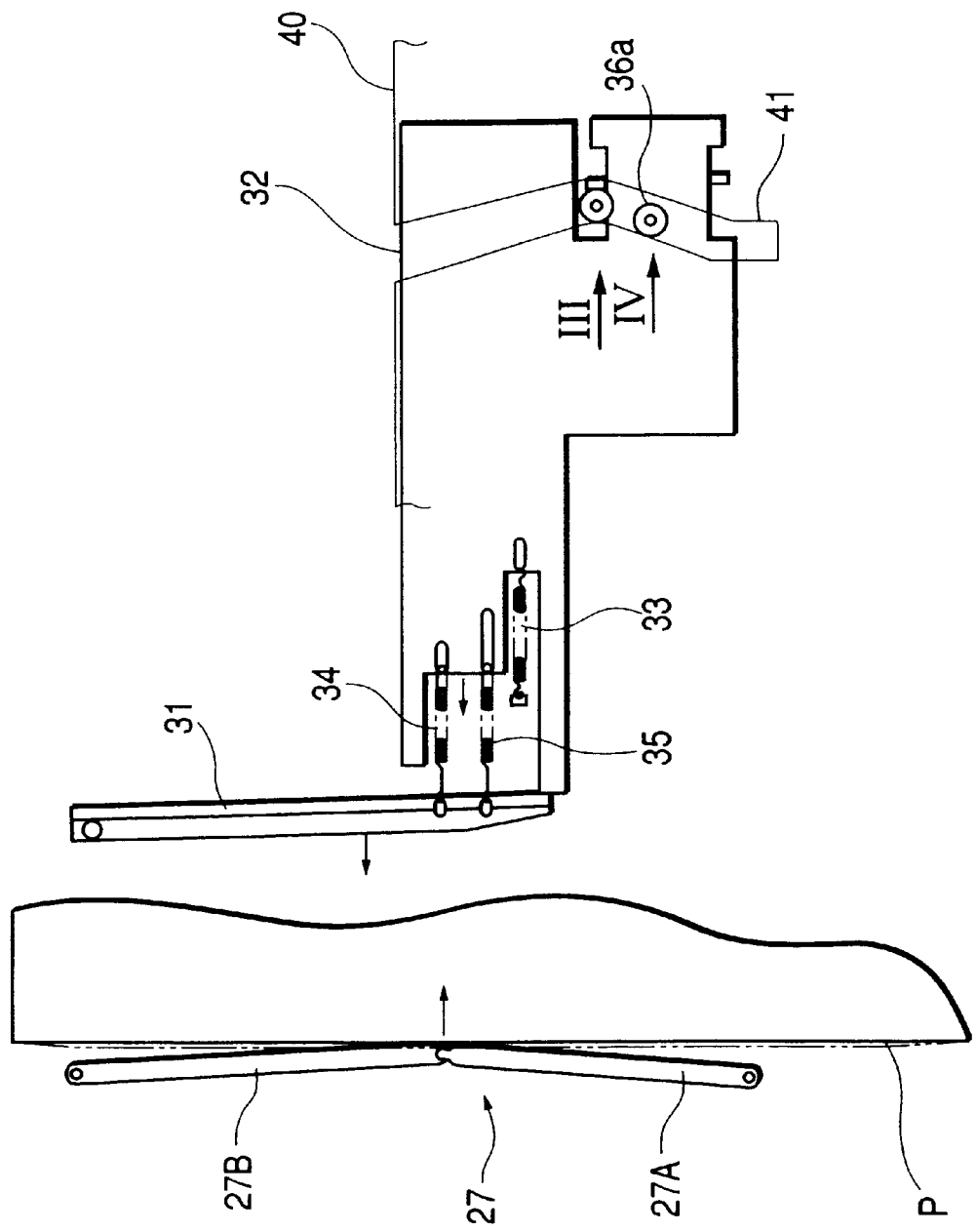
FIG. 15 is a diagram for explaining the state wherein the force produced by two springs is being employed for the paper side edge aligning process.
Figure 16:
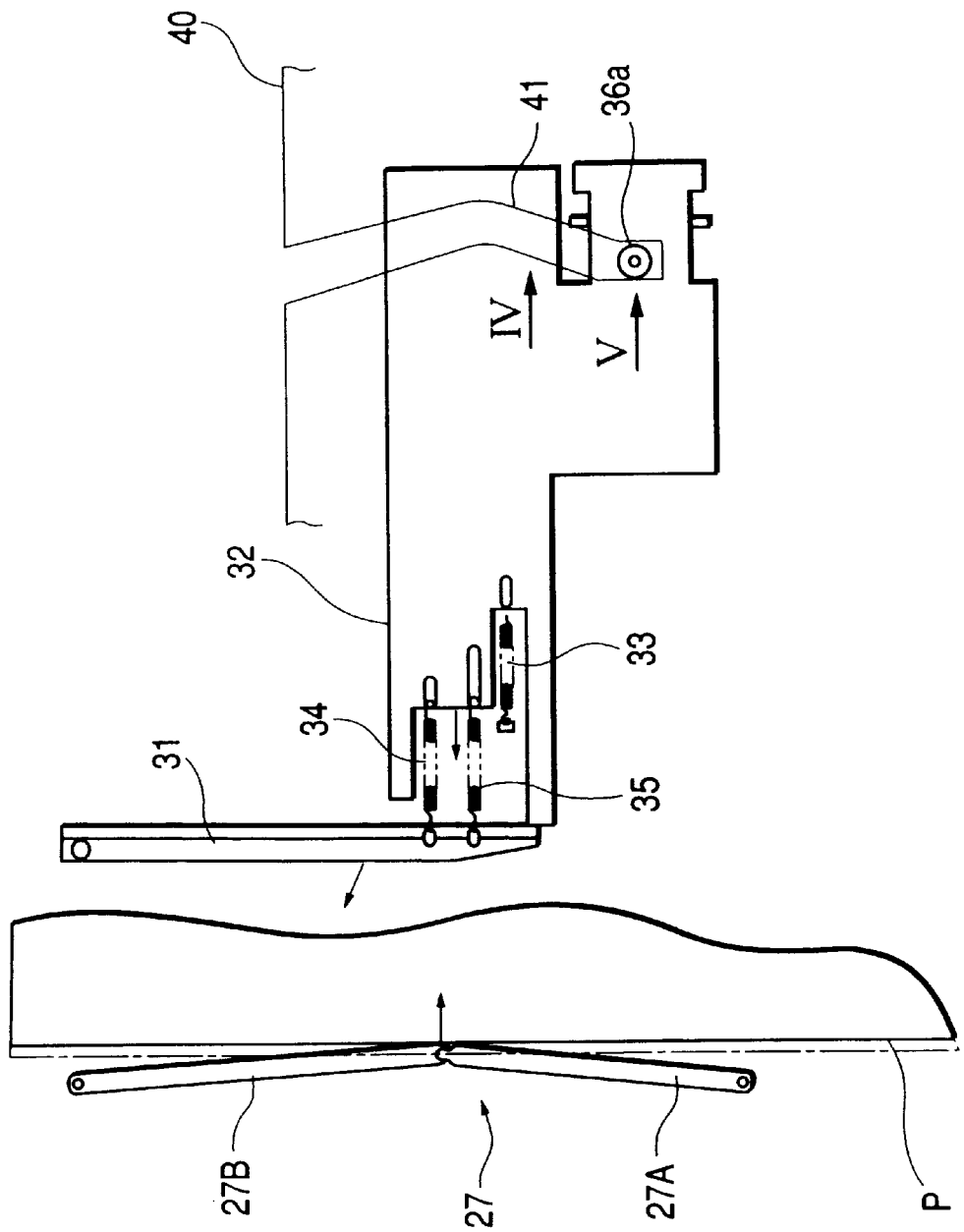
FIG. 16 is a diagram for explaining the state when the paper side aligning process has been completed and only one spring is in active use.

When the boss 36a is moved over location IV in FIG. 15, the urging force produced by the spring 35 is not applied, and when the boss 36a reaches the location V in FIG. 16, the state is reached wherein only the urging force produced by the spring 34 is employed to press against the side edges of the sheets.

In this manner, when the boss 36a is located at position III, the resultant urging force of the springs 34 and 35, i.e., the pressing force exerted against the side edges of the sheets, reaches the maximum, and the sheets are satisfactorily aligned in the widthwise direction. However, when a strong pressing force applied to the side edges is maintained throughout the paper feeding process, strong resistance will be encountered when a sheet is fed from the paper cassette 20, and this will constitute an obstacle to the efficient operation of the paper feeding process. Therefore, in this invention, when the paper aligning process has been satisfactorily completed, the boss 36a is moved to location V (FIG. 16), and the pressing force applied to the paper side edges is reduced. Thus, while the paper aligned state is maintained, the resistance encountered when the paper is fed from the paper cassette 20 is reduced.

Since the urging mechanism is constituted by the springs 34 and 35, the maximum pressing force is exerted only for the alignment of the side edges of the sheets, and the pressing force is reduced during the paper feeding.

According to the urging device having the multiple loading member of the invention, multiple springs are arbitrarily employed to exert a desired urging force on the applicator.

According to the paper feeding device of the present invention, a necessary pressing force can be exerted only when the side edges of the sheets are aligned. Thus, when the sheets are fed from the paper cassette, the pressing force is reduced so as to maintain the aligned paper state, and the load imposed on the paper feed roller can be reduced.

What is claimed is:

1. A paper feeding device, comprising:
   a cassette member, in which sheets to be fed are stacked;
   a side edge aligner, provided in the cassette member so as to be adjacent to side edges of the stacked sheets;
   a plurality of loading members, being deformable so as to respectively provide an urging force to the side edge aligner, such that the side edge aligner aligns the side edges of the stacked sheets at a predetermined position; and
   a load controller, for deforming the loading members such that a resultant urging force applied to the side edge aligner is varied between three or more levels.

2. The paper feeding device as set forth in claim 1, further comprising a cassette holder, to which the cassette member is detachably inserted,
   wherein the loading members include at least two loading members whose urging abilities are different from each other;
   wherein the load controller deforms weaker loading member in an initial stage and a final stage of the insertion operation of the cassette member;
   wherein the load controller deforms both of weaker and stronger loading members when the side edge aligner aligns the side edges of the stacked sheets.

3. The paper feeding device as set forth in claim 1, wherein the loading members provide the resultant urging force such that the side edge aligner is separable from the side edges of the stacked sheets.

4. The paper feeding device as set forth in claim 3, wherein the side edge aligner includes a pair of arm members which are almost linearly arranged; and
   wherein further ends of the arm members are pivotably supported by the cassette member, and closer ends thereof are coupled with the loading members.

5. The feeding device as set forth in claim 4, further comprising:
   an urging member for urging the movable plate toward a first direction which is opposed to the aligning movement of the side edge aligner; and
   a stopper for preventing the movable plate from moving toward the first direction,
   wherein the movable plate holds the side edge aligner at a position which is separated from the side edges of the stacked sheets, when the movement of the movable plate is restricted by the stopper.

6. The paper feeding device as set forth in claim 1, wherein the load controller includes a movable plate whose displacement amount is associated with the resultant urging force of the loading members;
   wherein a predetermined displacement amount of the movable plate is associated with each of the loading member; and
   wherein each of the loading members has no urging ability when the displacement amount of the movable plate is less than the associated predetermined displacement amount.

7. The paper feeding device as set forth in claim 6, wherein each of the loading member is provided with an engagement member;
   wherein each of the respective engagement members is placed within a slot which is formed in the movable plate, and which extends in a movable direction of the movable plate; and
   wherein each of the respective engagement member engages with the associated slot when the displacement amount of the movable plate exceeds the associated predetermined displacement amount.

8. The paper feeding device as set forth in claim 6, further comprising:
   a cassette holder, to which the cassette member is detachably inserted; and
   a cooperation mechanism for associating an insertion movement of the cassette member with the movement of the movable plate.

9. The paper feeding device as set forth in claim 8, wherein the cooperation mechanism includes a boss provided between the movable plate and the cassette member, and a cam groove in which the boss is moved in accordance with the insertion movement.

10. A paper feeding device, comprising:
    a cassette member, in which sheets to be fed are stacked;
    a side edge aligner, provided in the cassette member so as to be adjacent to side edges of the stacked sheets, the side edge aligner including a first load acting member and a second load acting member;
    a movable member, being movable with respect to the side edge aligner, the movable member including a first load application member and a second load application member;
    a first elastic member, deformably connected between the first load application member and the first load acting member; and
    a second elastic member, deformably connected between the second load application member and the second load acting member,
    wherein no load is applied on the first and second load application members, when a distance between the movable member and the side edge aligner is a first distance,
    wherein a first load is applied on the first load application member, and a first urging force for urging the side edge aligner toward the side edges of the stacked sheets acts on the first load acting member, when the distance between the movable member and the side edge aligner increases from the first distance by L1; and
    wherein a second load is applied on the second load application member, and a second urging force acts on the second load acting member in addition to the first urging force, when the movable member is moved so that the distance between the movable member and the side edge aligner increases from the first distance by L2 (L2>L1).

11. The paper feeding device as set forth in claim 10, wherein the first and second load acting members are provided as first and second slots extending in a movable direction of the movable member, respectively;
wherein the first elastic member is a tension spring, one end of which is formed with a hook member hooked over the first slot with a clearance L1, and the other end of which is fixed to the first load acting member; and
wherein the second elastic member is a tension spring, one end of which is formed with a hook member hooked over the second slot with a clearance L2, and the other end of which is fixed to the second load acting member.

12. The paper feeding member as set forth in claim 10, wherein the first and second load acting members are provided as first and second slots extending in a movable direction of the movable member, respectively;
wherein the first elastic member is a tension spring, one end of which is formed with a hook member hooked over the first slot with a clearance L1, and the other end of which is fixed to the first load application member; and
wherein the second elastic member is a tension spring, one end of which is formed with a hook member hooked over the second slot with a clearance L2, and the other end of which is fixed to the second load application member.

13. The paper feeding member as set forth in claim 10, wherein the first and second load application members are provided as first and second slots extending in a movable direction of the movable member, respectively;
wherein the first and second load acting members are provided as third and fourth slots extending in a movable direction of the movable member, respectively;
wherein the first elastic member is a tension spring, one end of which is formed with a hook member hooked over the first slot, and the other end of which is formed with a hook member hooked over the third slot;
wherein the second elastic member is a tension spring, one end of which is formed with a hook member hooked over the second slot, and the other end of which is formed with a hook member hooked over the fourth slot;
wherein an additional clearance between the both hook members and the associated slots in the first elastic member is L1; and
wherein an additional clearance between the both hook members and the associated slots in the second elastic member is L2.

14. The paper feeding device as set forth in claim 10, further comprising a cassette holder, to which the cassette member is detachably inserted,
wherein the movable member is moved such that only the first urging force is applied to the side edge aligner, then the second urging force is added to the first urging force, and then only the first urging force is applied again, in accordance with the inserting operation of the cassette member.

15. A paper feeding device, comprising:
a cassette member, in which sheets to be fed are stacked;
a side edge aligner, provided in the cassette member so as to be adjacent to side edges of the stacked sheets, the side edge aligner including first to n-th load acting members;
a movable member, being movable with respect to the side edge aligner, the movable member including first to n-th load application members; and
first to n-th first elastic members, deformably connected between the first to n-th load application members and the first to n-th load acting members, respectively;
wherein n is an integer which is 3 or more;
wherein no load is applied on the first to n-th load application members, when a distance between the movable member and the side edge aligner is a first distance;
wherein first to n-th loads are applied on the first to n-th load application members, and first to n-th urging forces for urging the side edge aligner toward the side edges of the stacked sheets act on the first to n-th load acting members in order, when the distance between the movable member and the side edge aligner increases from the first distance by L1, L2 . . . Ln (L1<L2< . . . <Ln).

16. The paper feeding device as set forth in claim 15, wherein the first to n-th load acting members are provided as first to n-th slots extending in a movable direction of the movable member, respectively;
wherein the first to n-th elastic member are tension springs, one ends of which are formed with hook members respectively hooked over the first to n-th slots with clearances L1, L2, . . . Ln, and the other ends of which are fixed to the first to n-th load acting members.

17. The paper feeding member as set forth in claim 15, wherein the first to n-th load acting members are provided as first to n-th slots extending in a movable direction of the movable member, respectively;
wherein the first to n-th elastic members are tension springs, one ends of which are formed with hook members respectively hooked over the first to n-th slots with clearances L1, L2, . . . Ln, and the other ends of which are fixed to the first to n-th load application members.

18. The paper feeding member as set forth in claim 15, wherein the first to n-th load application members are provided as first to n-th application-side slots extending in a movable direction of the movable member, respectively;
wherein the first to n-th load acting members are provided as first to n-th acting-side slots extending in a movable direction of the movable member, respectively;
wherein the first to n-th elastic member are tension springs, one ends of which are formed with hook members respectively hooked over the first to n-th application-side slots, and the other ends of which are formed with hook members respectively hooked over the first to n-th acting-side slots;
wherein additional clearances between the both hook members and the associated slots in the first to n-th elastic members are L1, L2, . . . Ln.

19. The paper feeding device as set forth in claim 15, further comprising a cassette holder, to which the cassette member is detachably inserted,
wherein the movable member is moved such that only the first to n-th urging forces are added in order as a resultant urging force applied to the side edge aligner, then the n-th to first urging force is reduced in order from the resultant force.

* * * * *